(12) United States Patent
Lucas (10) Patent No.: US 11,864,608 B1
(45) Date of Patent: Jan. 9, 2024

(54) ANTI-MOSQUITO GARMENT AND APPARATUS

(71) Applicant: Charles W. Lucas, Walterboro, SC (US)

(72) Inventor: Charles W. Lucas, Walterboro, SC (US)

( * ) Notice: Subject to any disclaimer, the term of this patent is extended or adjusted under 35 U.S.C. 154(b) by 303 days.

(21) Appl. No.: 16/945,802

(22) Filed: Jul. 31, 2020

Related U.S. Application Data (60) Provisional application No. 62/834,836, filed on Apr. 16, 2019.

(51) Int. Cl.
| | |
|---|---|
| *A41D 13/00* | (2006.01) |
| *A41D 31/02* | (2019.01) |
| *A41D 31/04* | (2019.01) |
| *B32B 5/18* | (2006.01) |
| *A45F 3/52* | (2006.01) |
| *A47G 9/08* | (2006.01) |
| *B32B 5/02* | (2006.01) |
| *B32B 5/24* | (2006.01) |

(52) U.S. Cl.
CPC ........... *A41D 31/04* (2019.02); *A41D 13/001* (2013.01); *A41D 31/02* (2013.01); *A45F 3/52* (2013.01); *A47G 9/08* (2013.01); *B32B 5/028* (2013.01); *B32B 5/18* (2013.01); *B32B 5/245* (2013.01); *A41D 2500/20* (2013.01); *A41D 2500/50* (2013.01); *B32B 2437/00* (2013.01)

(58) Field of Classification Search
CPC ...... A41D 13/001; A41D 31/04; A41D 31/02; A41D 2500/20; A41D 2500/50; A45F 3/52; A01K 55/00
See application file for complete search history.

(56) References Cited

U.S. PATENT DOCUMENTS

| | | | | |
|---|---|---|---|---|
| 2,344,811 | A * | 3/1944 | Gill ..................... | A42B 1/0187 2/457 |
| 5,357,635 | A * | 10/1994 | Lemoine .............. | A41D 13/001 2/84 |
| 2017/0224137 | A1* | 8/2017 | Hartdorn ................ | A01N 25/34 |

FOREIGN PATENT DOCUMENTS

| | | | | |
|---|---|---|---|---|
| KR | 20030064355 | A | * | 7/2003 |
| KR | 20050049072 | A | * | 5/2005 |
| KR | 20090042357 | A | * | 4/2009 |

* cited by examiner

*Primary Examiner* — Daniel J Colilla
(74) *Attorney, Agent, or Firm* — Gregory Finch; Finch Paolino, LLC (57) ABSTRACT

A novel mosquito shield for protection against mosquitos and other types of insects. The mosquito shield combines a protective netting with a memory foam material that provides comfort to the user/wearer. The memory foam, or alternative material, is connected to the mesh 5 in a square, waffle like, pattern to form the protective mosquito shield. The thickness of the memory foam creates distance between the protective netting and the user's skin. This then increases the effectiveness of the protective mosquito netting because the mosquito's proboscis (needle for sucking blood) can no longer reach the wearer's skin.

11 Claims, 7 Drawing Sheets

ANTI-MOSQUITO GARMENT AND APPARATUS

FIELD

The present disclosure is related to the field of insect protection; in particular, an anti-mosquito garment and apparatus.

SUMMARY

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented later.

An object of the present disclosure is a novel mosquito shield for protection against mosquitos and other types of insects. The mosquito shield combines a protective netting with a memory foam material that provides comfort to the user/wearer. The memory foam, or alternative material, is connected to the mesh in a square, waffle like, pattern to form the protective mosquito shield. The thickness of the memory foam creates distance between the protective netting and the user's skin. This then increases the effectiveness of the protective mosquito netting because the mosquito's proboscis (needle for sucking blood) can no longer reach the wearer's skin.

Another object of the present disclosure is a body suit created using the mosquito shield material. The body suit can be worn by a user to provide protection from mosquitos and various other insects while providing airflow for cooling.

Another object of the present disclosure is a sleeping net that can be formed using the mosquito shield material. The sleeping net allows a user to wrap themselves to prevent insect bites/stings.

Yet another object of the present disclosure is a sleeping bag manufactured from the mosquito shield material; the sleeping bag includes a zipper and reinforcement straps. The zipper allows for a person or people to enter and exit the sleeping bag, and the reinforcement straps provide additional structure to the sleeping bag.

The foregoing has outlined rather broadly the more pertinent and important features of the present invention so that the detailed description of the invention that follows may be better understood and so that the present contribution to the art can be more fully appreciated.

BRIEF DESCRIPTION OF DRAWINGS

The above and other objects, features and advantages of the present disclosure will be more apparent from the following detailed description taken in conjunction with the accompanying drawings, in which.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 1:
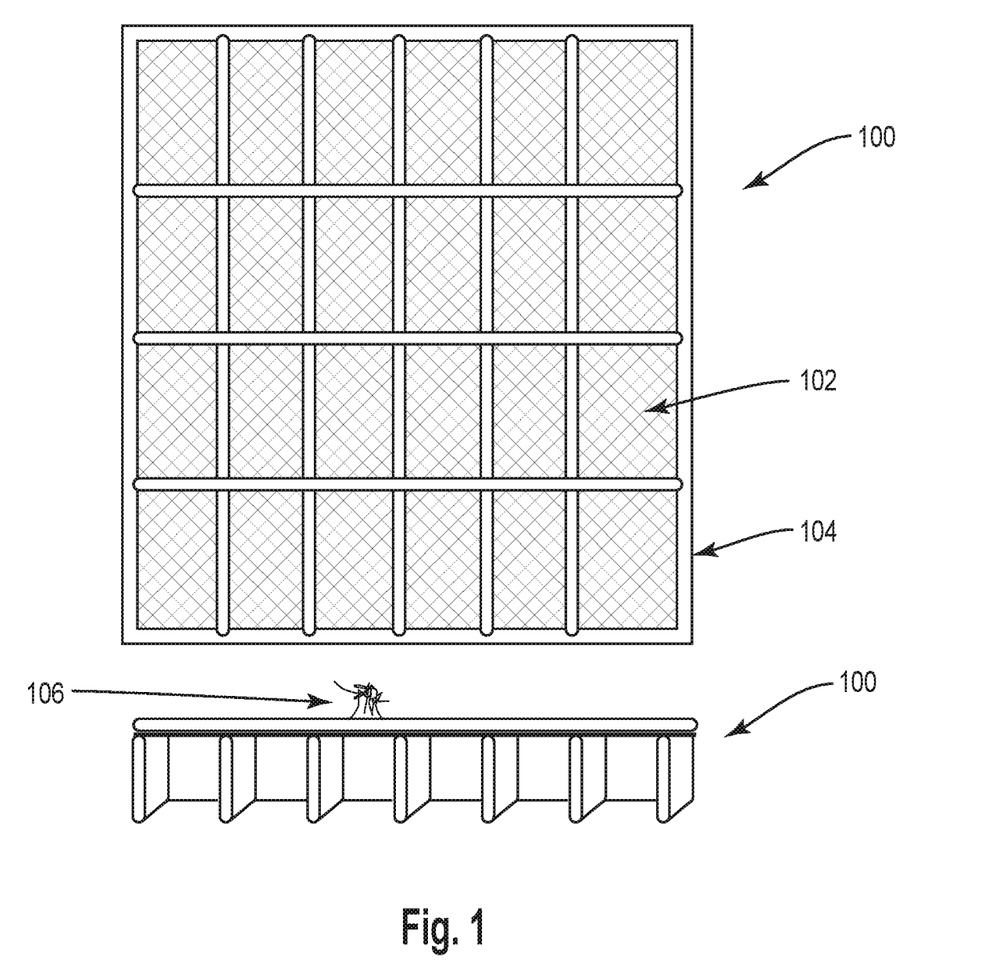
FIG. 1 shows a diagram of a top and a side view of the mosquito shield material, according to an embodiment.

FIG. 1 depicts a diagram of a mosquito shield 100 that provides protection to a user/wearer from mosquitos 106 or various other insects. The mosquito shield 100 comprises a mesh 102 and a plurality of foam strips 104.

The mesh 102 further comprises a plurality of hexagonal tessellations, or honeycomb shaped, openings that are sized to prevent the passage of mosquitos 106 or other insects therethrough. The mesh 102 may be made from cotton, polyethylene, polyester, polypropylene, nylon, or any other material that prevents mosquitos 106 from passage through. In addition, the mesh 102 size, i.e. the size of the hexagonal openings, can be up to 3 mm, or 0.12 inches. The thickness of mesh 102 is approximately 0.3175 cm, or ⅛ inches.

The plurality of foam strips 104 are cylindrical in shape and are created using viscoelastic polyurethane foam, low-resilience polyurethane foam, or reasonable equivalents thereof. The plurality of foam strips 104 may also be shaped as, but are not limited to, a rectangular prisms, cuboids, or any other three dimensional shape that creates distance between the user/wearer and the mesh 102. The mosquito 106 has a proboscis which is approximately 2.5 mm to 3.5 mm long. Therefore, the foam strips 104 must have a thickness of at least 3.5 mm between the mesh 102 and the human body to prevent the mosquito from reaching the skin of the user/wearer. In a preferred embodiment, the plurality of foam strips 104 have a thickness approximately 0.8 cm, or 5/16 inches. Each foam strip in the plurality of foam strips 104 is separated vertically and horizontally form each other to form a waffle like pattern or square grid on the backside of the mesh 102. The vertical and horizontal separation of the foam strips 104 can be up to 2.6 cm or 1 inch but is preferably 0.95 cm or ⅜ inches.

Upon creation of mosquito shield 100, a first group of foam strips are molded to the backside of mesh 102 and are equally spaced in a first direction. Subsequently, a second group of foam strips 104 are molded to the backside of mesh 102 and are equally spaced in a second direction. The second direction is perpendicular to the first direction. Both the first group and second group of foam strips 104 are molded to the backside of mesh 102 in a square grid pattern as described above to create the mosquito shield 100. The foam strips 104 may be coupled to the mesh 102 via an adhesive, a heat press fit, tying means, or others.

Figure 2:
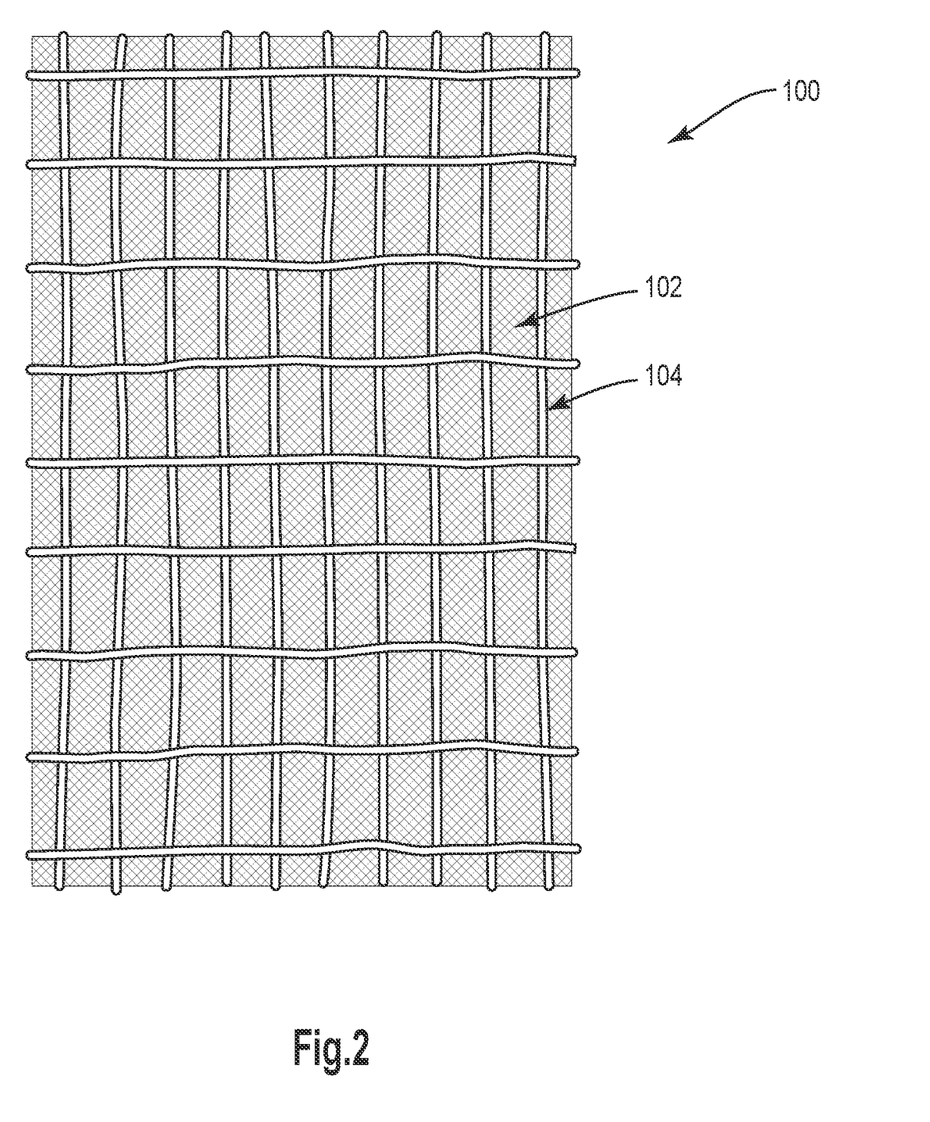
FIG. 2 shows a top view of a sample of the mosquito shield material, according to an embodiment.
Figure 3:
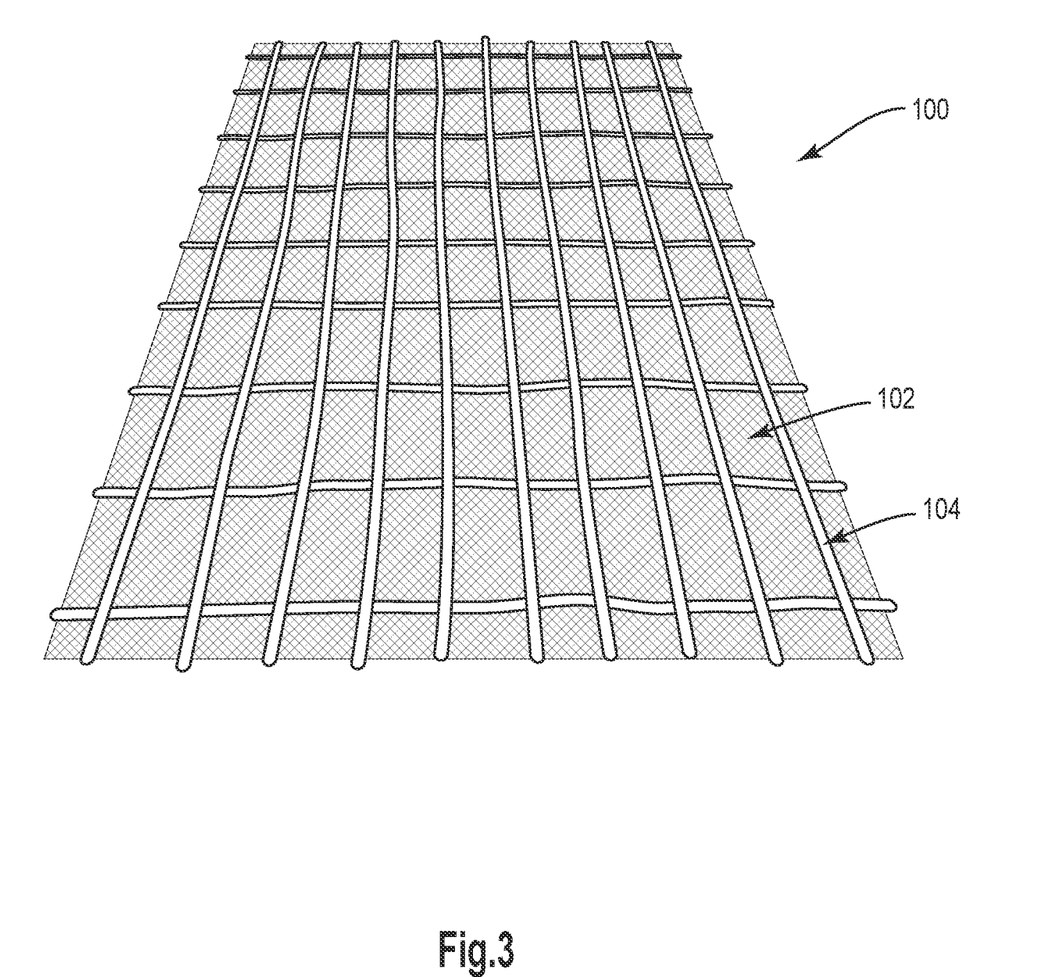
FIG. 3 shows a bottom view of a sample of the mosquito shield material, according to an embodiment.

Referring now to FIGS. 2 and 3, FIG. 2 depicts a top view of a sample cut out of mosquito shield 100, and FIG. 3 depicts a bottom view of the same. The mosquito shield 100 can be manufactured in small or large quantities and used to create a variety of products.

Figure 4:
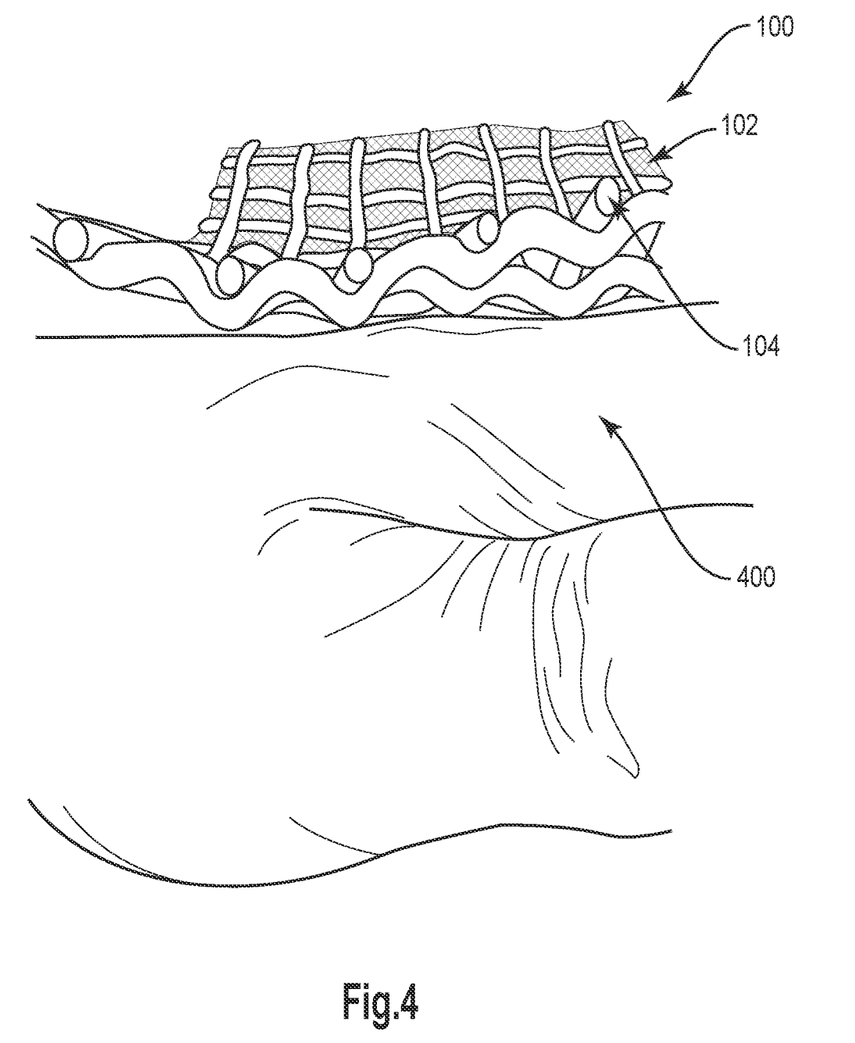
FIG. 4 shows the mosquito shield against a human hand, according to an embodiment.

FIG. 4 shows the mosquito shield 100 against a human hand 400. The thickness of the foam strips 104 creates distance between the human hand 400 and the mesh 102 that prevents mosquitos and other insects from biting.

Figure 5:
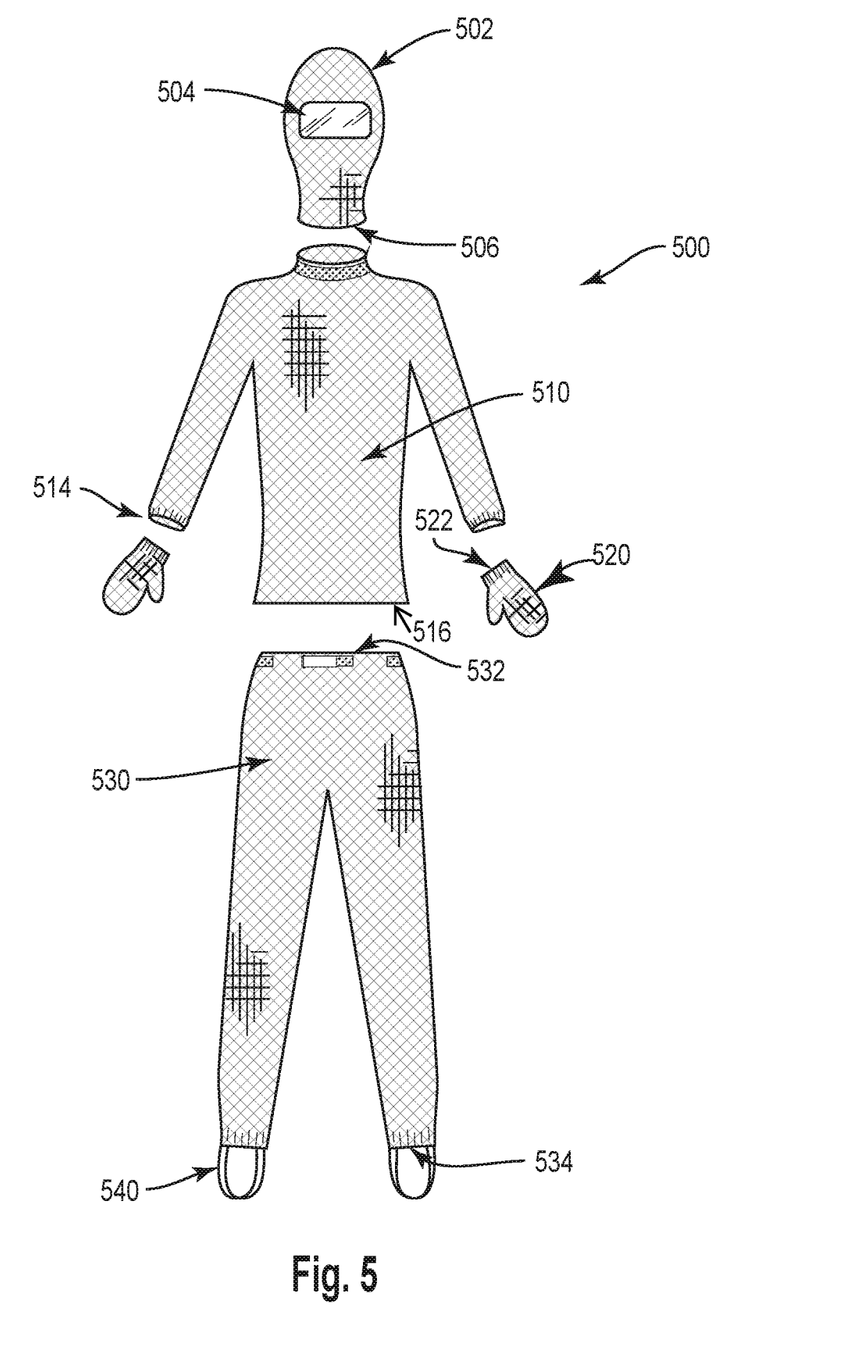
FIG. 5 shows a diagram of a body suit formed from the mosquito shield material, according to an embodiment.

Referring now to FIG. 5, a diagram of a bodysuit 500 created using the mosquito shield 100 material is shown. Bodysuit 500 is intended to be worn over the users clothing to protect their entire body from mosquito/insect bites. Additionally, the hexagonal openings of the mesh 102 allow for cooling airflow to pass through which will maintain the comfort of the bodysuit 500 wearer. The bodysuit 500 further comprises a hood 502, overshirt 510, mittens 520, overpants 530, and ankle covers 540. Each component of bodysuit 500 mentioned above may be worn in any combination; for example, the hood 502 may be worn in combination with the overpants 530 or any other combination. Furthermore, each component of the bodysuit 500 is considered to be independent; although the components may be worn together, they may also be worn separately or independently.

Hood 502 further comprises a plastic window 504 that allows the user to see while maintaining protected from insect bites. The plastic window 504 may also be a screen, a cutout, goggles, or others.

Velcro® may be used to couple the neck opening 506 of hood 502 to a collar 512 of overshirt 510 in order to prevent mosquitos or other insects from penetrating the seams of the bodysuit 500; furthermore, hook and loop fasteners may disposed on the waistline 532 of overpants 530 to adjustably tighten the waistline 532 according to the wearers waist size. Elastic bands may be used at cuffs 514, waistband 516, ankle openings 534, ankle cover 540, and mitten openings 522 to securely couple the bodysuit 500 to the body of the user. Additionally, the elastic bands and the hook and loop fasteners may be used interchangeably, i.e. hook and loop fasteners may be used in place of the elastic bands and vice versa.

Figure 6:
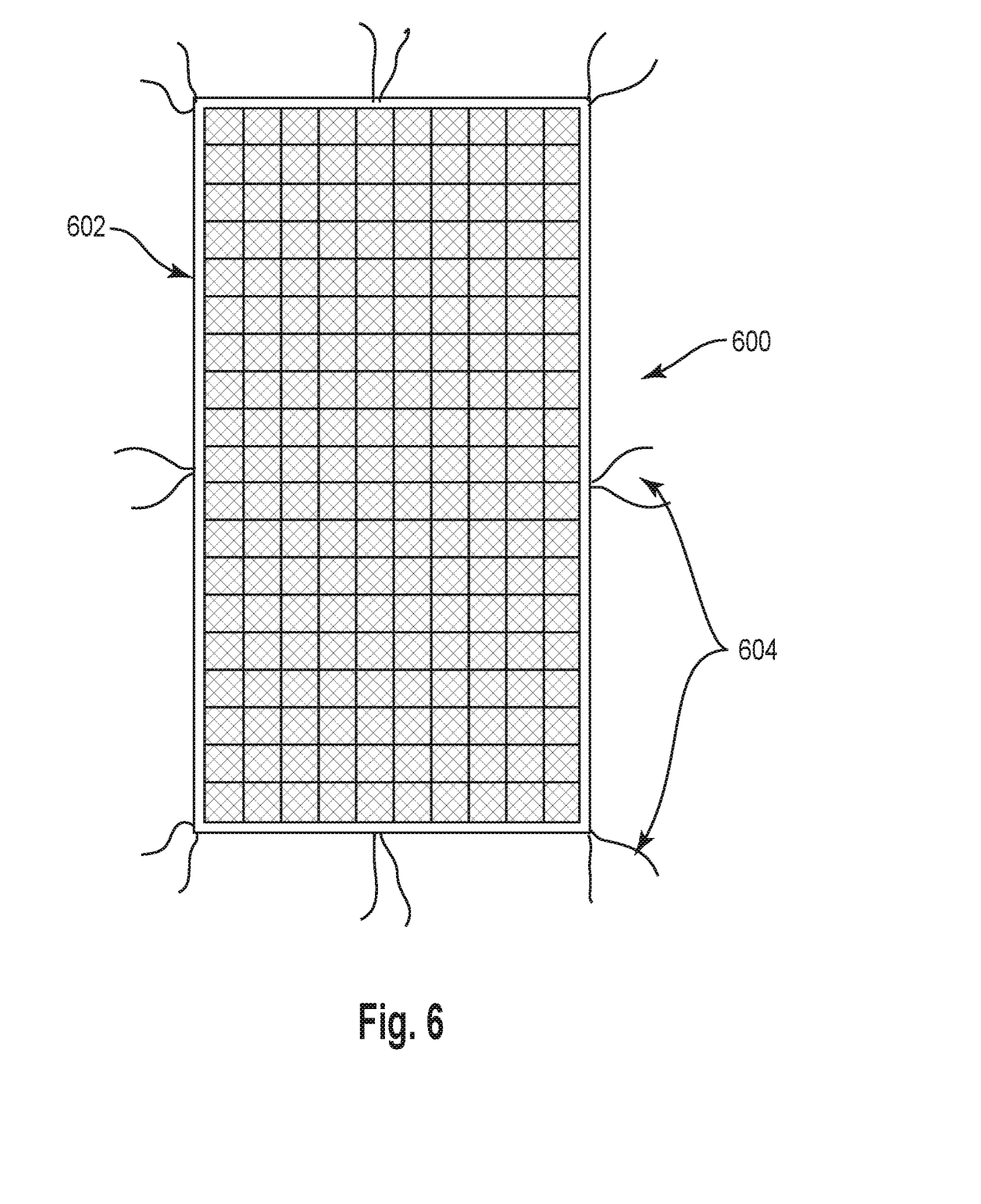
FIG. 6 shows a diagram of a sleeping net formed from the mosquito shield material, according to an embodiment; and, FIG. 7 shows a diagram of a sleeping bag formed from the mosquito shield material, according to an embodiment.

FIG. 6 depicts a diagram of a sleeping net 600 created using the mosquito shield 100 material. The sleeping net 600 may be approximately 2.4 by 2.7 meters in size, or 8 by 9 feet and is generally rectangular in shape. The sleeping net 600 may be wrapped around a sleeping person to protect from mosquitos or other insects. Furthermore, sleeping net 600 comprises a reinforced border 602 and ties 604. The reinforced border 602 provides structural support and weight to the outer edge of the sleeping net 600 and may be in the form of a hemmed fabric. The ties 604 may be used to couple the sleeping net 600 to the ground. Also, the ties may be used to fold and store away the sleeping net 600 when not in use.

Figure 7:
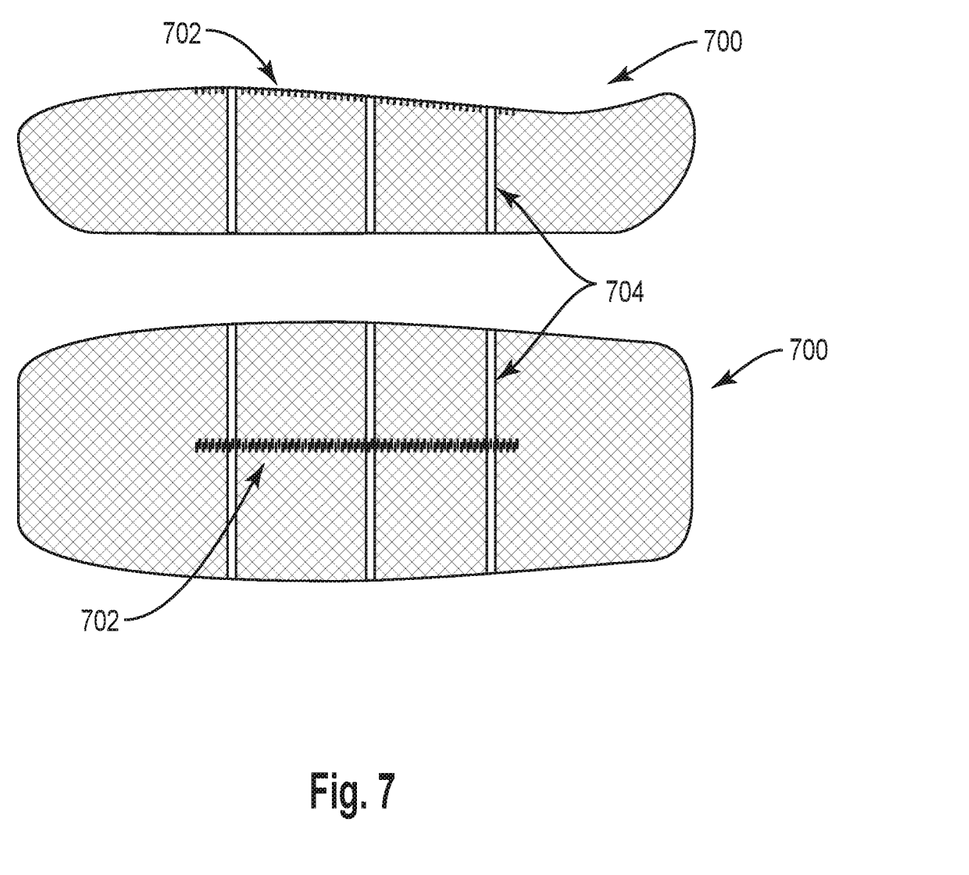

Referring now to FIG. 7, which depicts a sleeping bag 700 that is formed using the mosquito shield 100 material. Sleeping bag 700 may be sized and shaped to protect a person or multiple people from mosquitos or other insects while asleep. Said sleeping bag 700 comprises zipper 702 and reinforcement straps 704. Said zipper 702 may be opened or closed to allow a person or multiple people to enter and exit the sleeping bag 700. The reinforcement straps 704 provide structure and shape to the sleeping bag 700. Both the zipper 702 and the reinforcement straps 704 may be sewn to the sleeping bag 700.

The above detailed description includes references to the accompanying drawings, which form a part of the detailed description. The drawings show, by way of illustration, specific embodiments in which the invention may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

What is claimed is:

1. An anti-mosquito apparatus comprising:
   a mesh substrate comprising a plurality of mesh openings being sized to prevent the passage of insects therethrough; and
   a plurality of foam strips disposed on a surface of the mesh substrate, the plurality of foam strips having a thickness of at least 3.5 mm,
   wherein the plurality of foam strips comprises a first layer of foam strips disposed on the surface of the mesh substrate in a first direction and a second layer of foam strips disposed on the surface of the mesh substrate and in a second direction,
   wherein the first direction is perpendicular to the second direction,
   wherein the second layer of foam strips are disposed over the top of the first layer of foam strips to form a grid pattern,
   wherein the plurality of foam strips are cylindrical in shape.

2. The anti-mosquito apparatus of claim 1, wherein the plurality of foam strips are constructed from a viscoelastic polyurethane foam or a low-resilience polyurethane foam.

3. The anti-mosquito apparatus of claim 1, wherein the mesh substrate and plurality of foam strips are fashioned to construct a body suit configured to be worn by a user as a protective outerwear layer.

4. The anti-mosquito apparatus of claim 3, wherein the body suit comprises a hood, an overshirt, an overpants, a pair of mittens, and a pair of ankle covers.

5. The anti-mosquito apparatus of claim 4, wherein each of the hood, the overshirt, the overpants, the pair of mittens, and the pair of ankle covers may be separated from each other.

6. The anti-mosquito apparatus of claim 1, wherein the plurality of foam strips are heat press fit to the surface of the mesh substrate.

7. The anti-mosquito apparatus of claim 4, wherein the hood further comprises a plastic window configured to enable unobstructed vision for the user when worn.

8. The anti-mosquito apparatus of claim 1, wherein the mesh substrate and plurality of foam strips are fashioned to construct a sleeping net rectangular in size to be worn by a user as a protective layer to prevent insect bites while sleeping.

9. The anti-mosquito apparatus of claim 8 wherein the sleeping net further comprises a reinforced border surrounding the perimeter of the sleeping net and ties affixed to the perimeter of the sleeping net.

10. The anti-mosquito apparatus of claim 1, wherein the mesh substrate and plurality of foam strips are fashioned to construct a sleeping bag to form a protective barrier to protect a user from insect bites while sleeping.

11. The anti-mosquito apparatus of claim 10, wherein the sleeping bag further comprises a zipper and reinforcement straps permanently affixed to the sleeping bag through stitching.

\* \* \* \* \*